United States Patent
Abhold et al.

(10) Patent No.: US 9,487,264 B2
(45) Date of Patent: Nov. 8, 2016

(54) BRAKE SYSTEM

(71) Applicant: Hayes Bicycle Group, Inc., Mequon, WI (US)

(72) Inventors: Timothy Jerome Abhold, Delafield, WI (US); John Larry Thomas, Cedarburg, WI (US)

(73) Assignee: Hayes Bicycle Group, Inc., Mequon, WI (US)

( * ) Notice: Subject to any disclaimer, the term of this patent is extended or adjusted under 35 U.S.C. 154(b) by 0 days.

(21) Appl. No.: 14/484,410

(22) Filed: Sep. 12, 2014

(65) Prior Publication Data

US 2015/0083531 A1    Mar. 26, 2015

Related U.S. Application Data

(60) Provisional application No. 61/880,825, filed on Sep. 20, 2013.

(51) Int. Cl.
 *B62L 3/02* (2006.01)
 *B60T 7/10* (2006.01)
 *B60T 11/22* (2006.01)
 *B62K 23/06* (2006.01)

(52) U.S. Cl.
 CPC ............... *B62L 3/023* (2013.01); *B60T 7/102* (2013.01); *B60T 11/22* (2013.01); *B62K 23/06* (2013.01)

(58) Field of Classification Search
 CPC .............................. B62L 3/023; B62L 3/026
 USPC ....... 188/24.11, 24.22, 26, 344; 60/588, 594
 See application file for complete search history.

(56) References Cited

U.S. PATENT DOCUMENTS

| | | | | |
|---|---|---|---|---|
| 5,477,682 A * | 12/1995 | Tobiasz | .................. | B60T 11/16 60/583 |
| 7,516,616 B2 * | 4/2009 | Tetsuka | .................. | B60T 7/102 60/533 |
| 7,578,375 B2 * | 8/2009 | Lin | .......................... | B60T 7/10 188/344 |
| 7,757,821 B2 * | 7/2010 | Tetsuka | .................. | B62L 3/023 188/26 |
| 8,561,402 B2 * | 10/2013 | Dunlap, III | ............. | B60T 11/16 60/588 |
| 2008/0307922 A1 * | 12/2008 | Wen | ..................... | B62K 23/06 74/523 |
| 2009/0205330 A1 * | 8/2009 | Dunlap, III | ............ | B60T 7/102 60/584 |
| 2012/0160625 A1 * | 6/2012 | Jordan | ................... | B60T 7/102 188/344 |
| 2012/0222416 A1 * | 9/2012 | Hirose | ................... | B62L 3/023 60/594 |
| 2013/0008751 A1 * | 1/2013 | Dunlap, III | ............ | B62L 3/023 188/347 |

* cited by examiner

*Primary Examiner* — Thomas J Williams

(57) ABSTRACT

A brake system for a bicycle is disclosed. The brake system comprises an actuation mechanism shown as a master cylinder assembly and a brake or brake mechanism for the wheels of the bicycle. The mechanism/assembly comprises (among other parts, components and assemblies) a body or housing, a piston assembly, an actuating lever on a pivot pin, a bladder, a retainer and a primary seal. The bladder is fixed at a first end to the piston and fixed at a second end to the retainer. A reservoir is defined by the piston, the body, and the bladder. Advancement of the piston along the stroke causes the piston to seal against a primary seal and separate the reservoir from a pressure chamber in the body. A retainer may be provided to seal the bladder to the body, act as a piston guide bushing, act as a pivot bushing, and act as a stroke limiter. Upon advancement the piston will contact the primary seal and separate the reservoir from the pressure chamber as the bladder rolls out thus pressurizing the fluid. Stroke is limited at one end by a feature on the retainer which contacts the cam surface on the lever preventing further rotation/movement and at the other end by a stop pin.

24 Claims, 7 Drawing Sheets

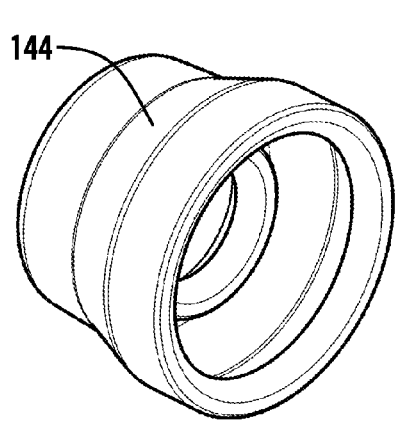
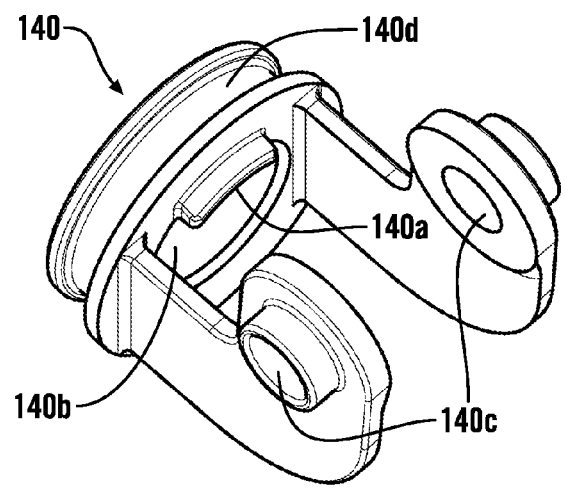
FIG. 9  FIG. 10A
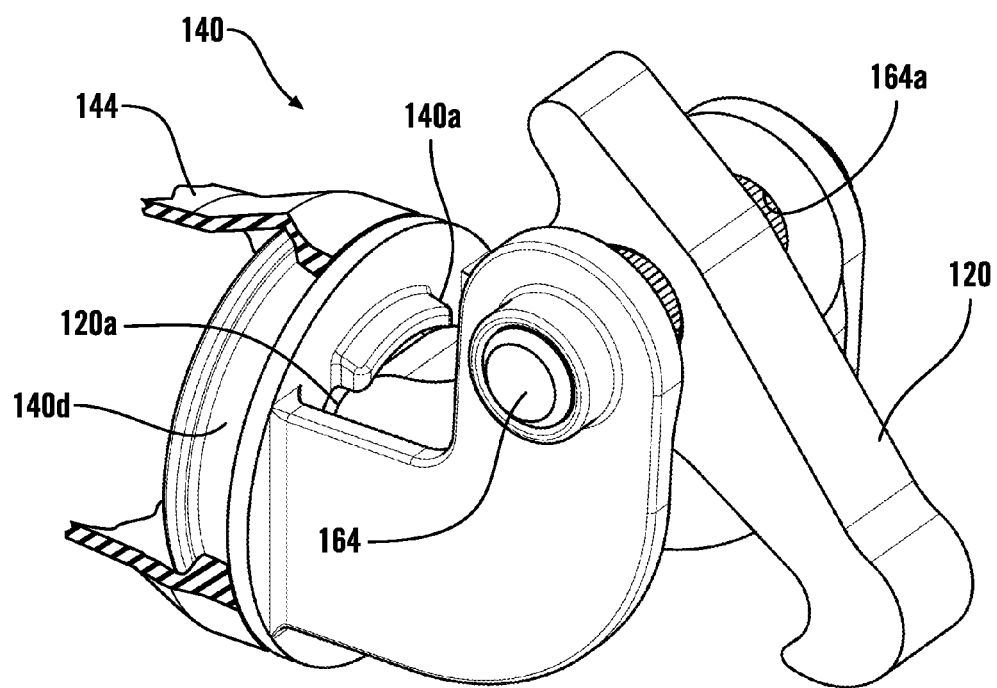
FIG. 10B

BRAKE SYSTEM

CROSS-REFERENCE TO RELATED APPLICATION

The present application claims the benefit of priority of U.S. Provisional Application No. 61/880,825 titled "Brake System" filed on Sep. 20, 2013, which application is incorporated by reference.

FIELD

The present invention relates to a brake system. The present invention also relates to a brake system for a bicycle such as a mountain bike. The present invention further relates to a master cylinder assembly (actuation mechanism) for a brake system.

BACKGROUND

It is well-known to provide a brake system for a bicycle. Such known brake systems comprise a brake mechanism at a wheel (or at each wheel) and a brake actuation mechanism that allows the rider to apply braking force selectively to maintain control while riding the bicycle. It is known to provide a brake system with a brake actuation mechanism in the form of a brake master cylinder assembly that is mounted on the handle bar of the bicycle and actuated by hand by the rider. Such known assemblies comprise a hand lever for the rider and are configured to transmit action applied by the rider at the hand lever to the brake mechanism at a corresponding wheel of the bicycle.

SUMMARY

Accordingly, it would be advantageous to provide a brake system for a wheeled vehicle such as a bicycle that has an improved configuration that (among other advantageous features) not only performs suitably but also is relatively compact in form and/or relatively efficient to produce and/or relatively convenient to assemble and/or containing fewer parts.

The present invention relates to a brake system of a type with a master cylinder using a fluid. The system comprises a body, a piston, and a bladder to define a reservoir having a volume to contain fluid. The bladder is connected to the piston. The body comprises a pressure chamber having a volume so that (a) advancement of the piston reduces the volume of the pressure chamber and (b) retraction of the piston expands the volume of the pressure chamber. The body comprises a seal for the piston and the pressure chamber.

The present invention also relates to a brake system of a type using fluid. The system comprises a body defining a chamber having a volume and a piston movable within the chamber of the body. The system also comprises a bladder defining a reservoir having a volume, a lever to actuate the piston and a retainer for the bladder. The bladder is retained by the retainer at a first end and retained by the piston at a second end. The retainer seals the bladder to the body; the retainer comprises a guide for the piston; the retainer is configured to limit the length of the stroke of movement of the piston.

The present invention further relates to a brake system. The system comprises a body defining a chamber, a piston movable within the body, a lever to actuate the piston, and a pin for the lever to secure the lever in the body and facilitate rotation of the lever when actuated to advance the piston into the chamber. The pin comprises at least one end section and a generally intermediate section to secure to the lever.

FIGURES

FIG. 9 is a schematic perspective view of the bladder of the master cylinder assembly of the brake system according to an exemplary embodiment.

FIGS. 10A and 10B are schematic perspective views of the retainer for the master cylinder assembly of the brake system according to an exemplary embodiment.

DESCRIPTION

Figure 1:
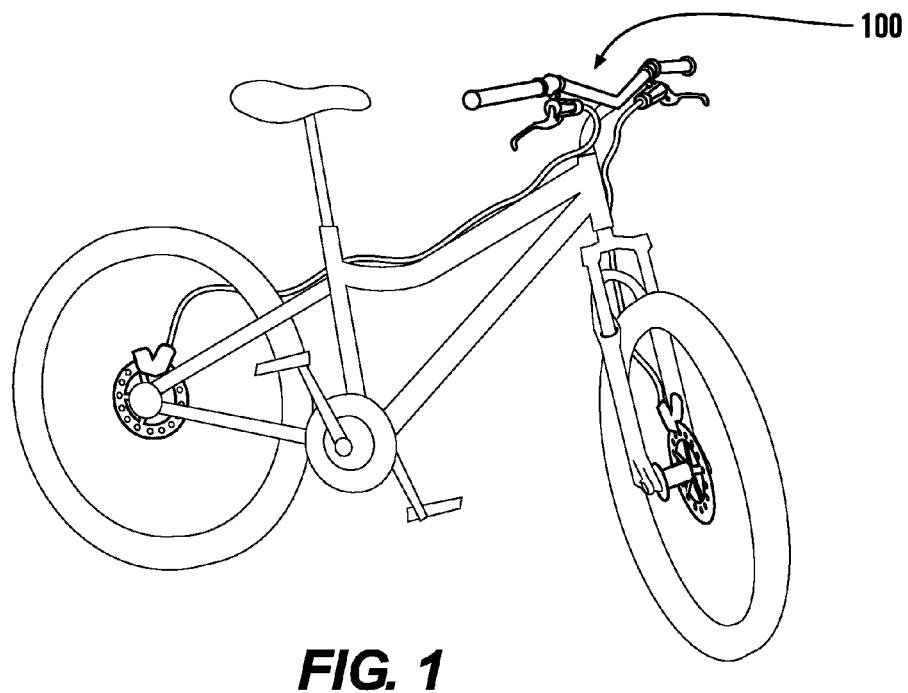
FIG. 1 is a schematic elevation view of a mountain bicycle with a brake system according to an exemplary embodiment.
Figure 2A:
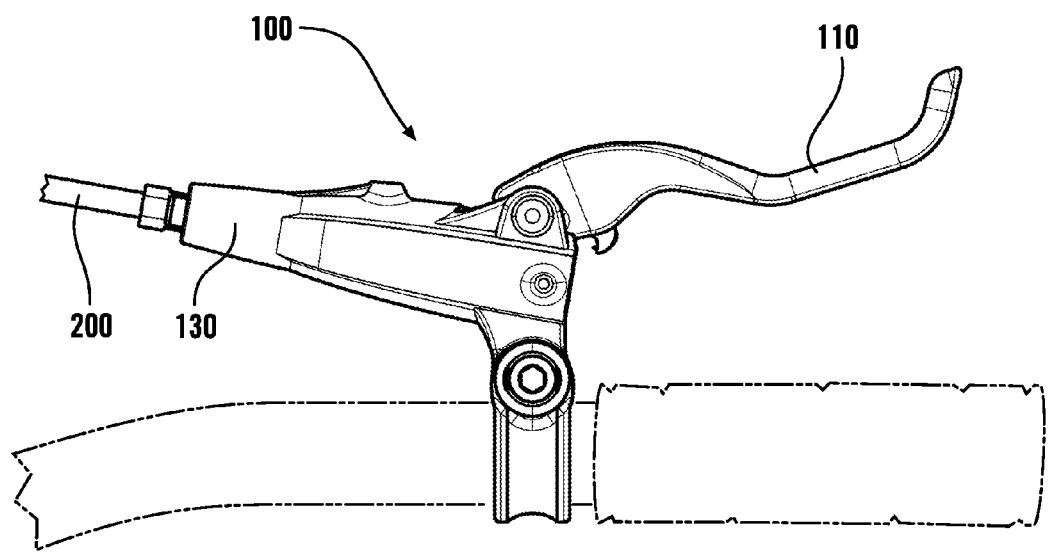
FIG. 2A is a schematic side view of the actuation mechanism/master cylinder assembly of the brake system according to an exemplary embodiment.

Referring to FIGS. 1 and 2A, a bicycle with a brake system is shown schematically according to an exemplary embodiment. As indicated in FIGS. 1 and 2A, according to an exemplary embodiment, the brake system is actuated by an actuation mechanism shown as brake master cylinder assembly 100. As indicated in FIG. 1, the brake system comprises a set of brake mechanisms or brakes (e.g. shown as disc brakes) coupled to each wheel of the bicycle actuated by a corresponding set of actuation mechanisms (e.g. that would operate under the control of a rider). According to other exemplary embodiments, the brake system including the assembly/mechanism 100 could be configured or adapted for use on any of a wide variety of wheeled vehicles (e.g. other types of bicycles, motorized bicycles or other cycles, scooters, etc.). According to an exemplary embodiment as indicated in FIGS. 1 and 2A, the assembly/mechanism 100 is mounted to the handlebar of the bicycle. See also FIGS. 2B-2C and 5A (e.g. arrangement for mounting by clamp 132).

Figure 2B:
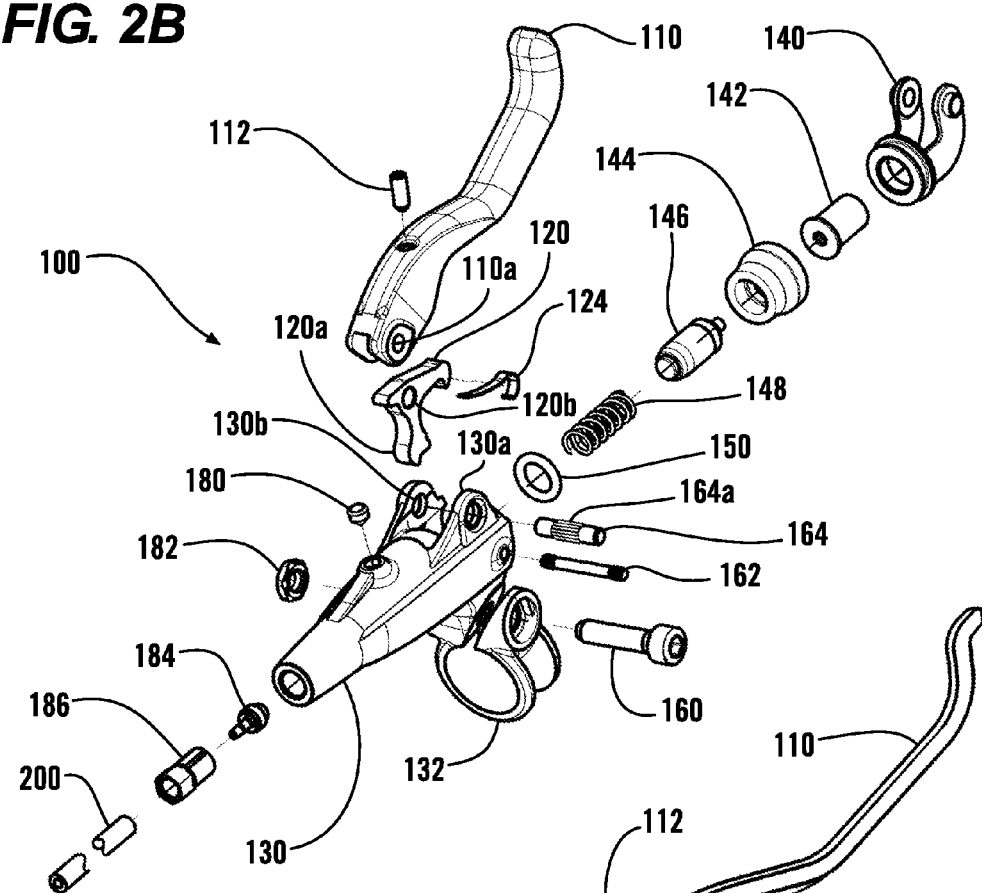
FIG. 2B is an exploded perspective view of the master cylinder assembly of the brake system according to an exemplary embodiment.
Figure 2C:
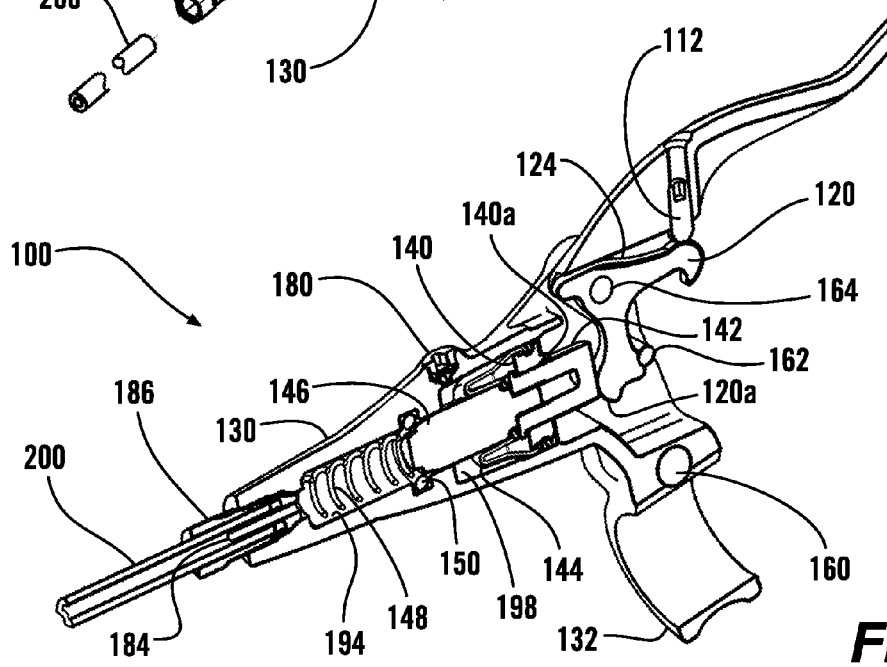
FIG. 2C is a cut-away perspective view of the master cylinder assembly of the brake system according to an exemplary embodiment.
Figure 3:
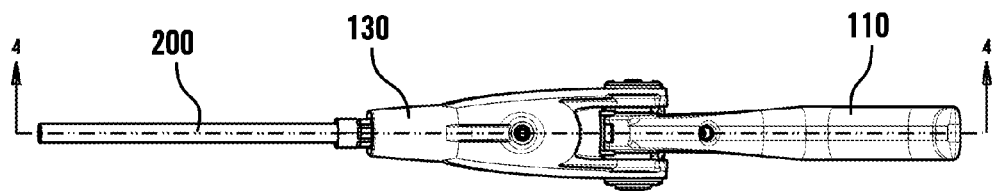
FIG. 3 is a schematic top view of the master cylinder assembly of the brake system according to an exemplary embodiment.
Figure 4:
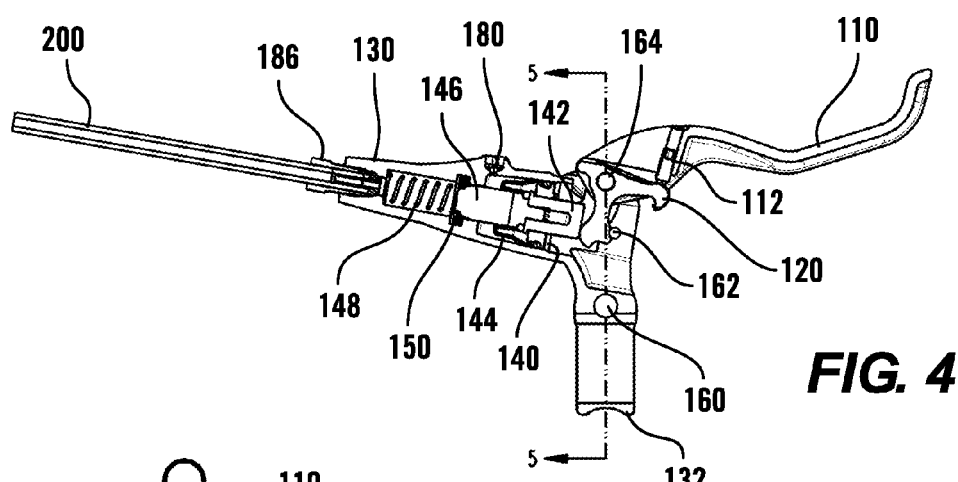
FIG. 4 is a schematic cross-section view of the master cylinder assembly of the brake system according to an exemplary embodiment.

Parts and components of the brake master cylinder assembly 100 are identified in FIGS. 2B and 2C. Referring to FIGS. 2B/C, the assembly of master cylinder assembly 100 is shown according to an exemplary embodiment. Body or housing 130 provides a mounting 130a for lever 110 (e.g. at end 110a) and cam 120 on pivot pin 164 biased by spring 124 (e.g. leaf spring); cam 120 is driven by lever 110 through adjuster screw 112; motion of cam 120 is limited by stop pin 162. Retainer 140 inserted into housing 130 is also secured at flanges adjacent the mounting on housing 130 by pivot pin 164. Retainer 140 provides a bushing for piston cap 142 which is installed on piston 146 (e.g. providing a cam surface 142a to engage cam surface 120a of cam 120); the piston cap 142 retains one end of a flexible bladder 144 to piston 146; the other end of the flexible bladder 144 is installed on retainer 140; return spring 148 is fitted to piston 146; primary seal 150 and piston 146 are inserted into body/housing 130. A mounting clamp 132 with fastener 160 and nut 182 secures body 130 to the bicycle. See FIGS. 1 and 2A (e.g. showing securing to handlebar of bicycle). A fastener shown as bleed screw 180 is provided to seal body 130. A fitting set 184/186 secures tube or hose 200 connecting the assembly 100 to a brake mechanism. See FIGS. 1 and 2A/B/C. (As indicated, a brake mechanism may be provided for each wheel.)

Figure 5A:
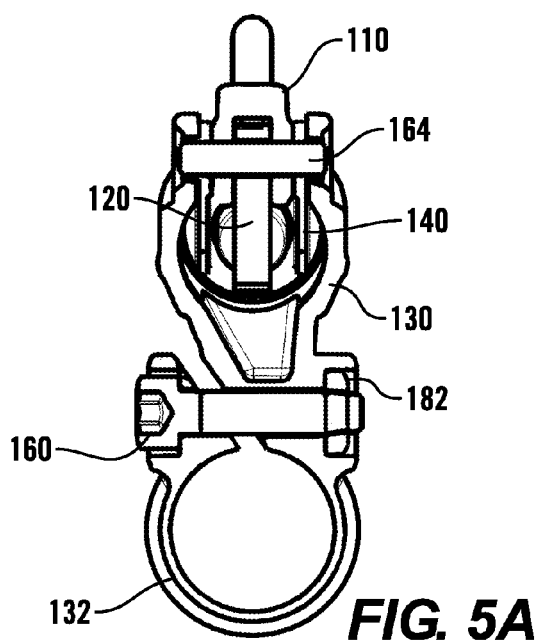
FIG. 5A is a schematic cross-section view of the master cylinder assembly of the brake system according to an exemplary embodiment.
Figure 5B:
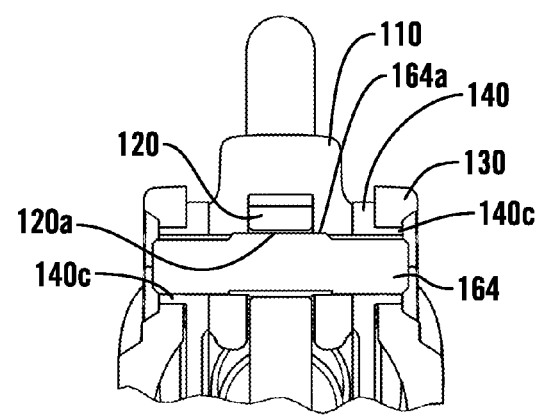
FIG. 5B is a schematic cross-section view of the master cylinder assembly of the brake system according to an exemplary embodiment.
Figure 6A:
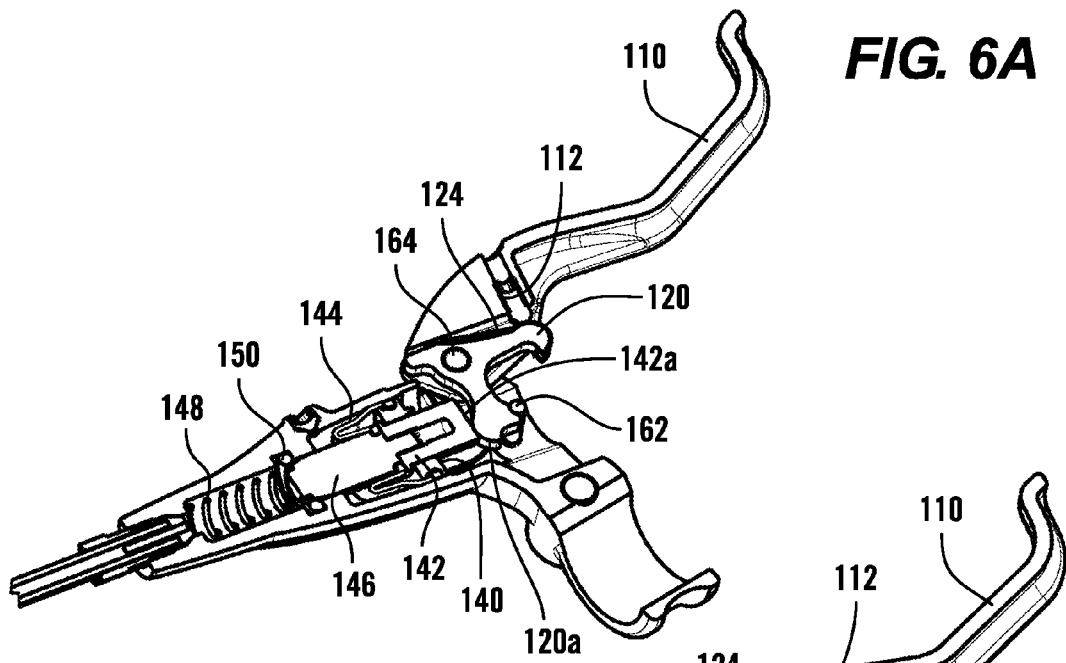
FIGS. 6A to 6C are schematic cut-away perspective views of the master cylinder assembly of the brake system in operation according to an exemplary embodiment.
Figure 6B:
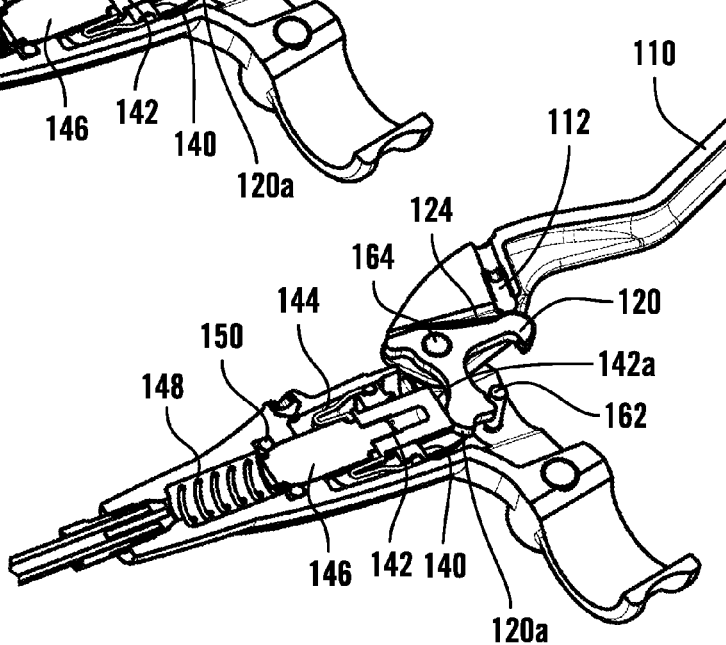
Figure 6C:
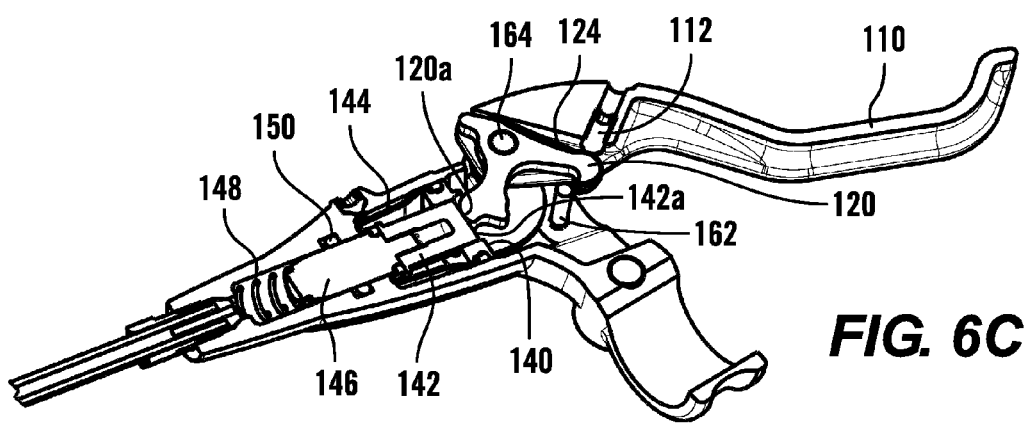
Figure 7A:
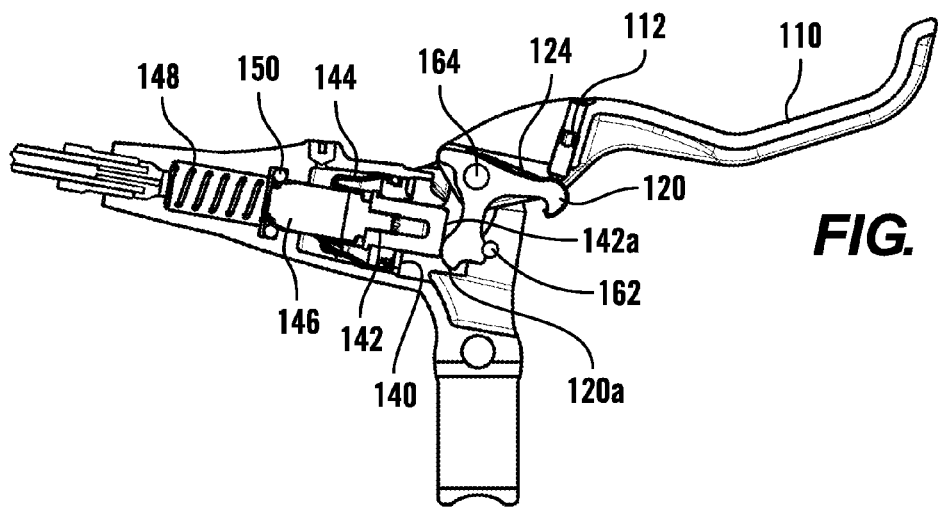
FIGS. 7A to 7C are schematic cross-section views of the master cylinder assembly of the brake system in operation according to an exemplary embodiment.
Figure 7B:
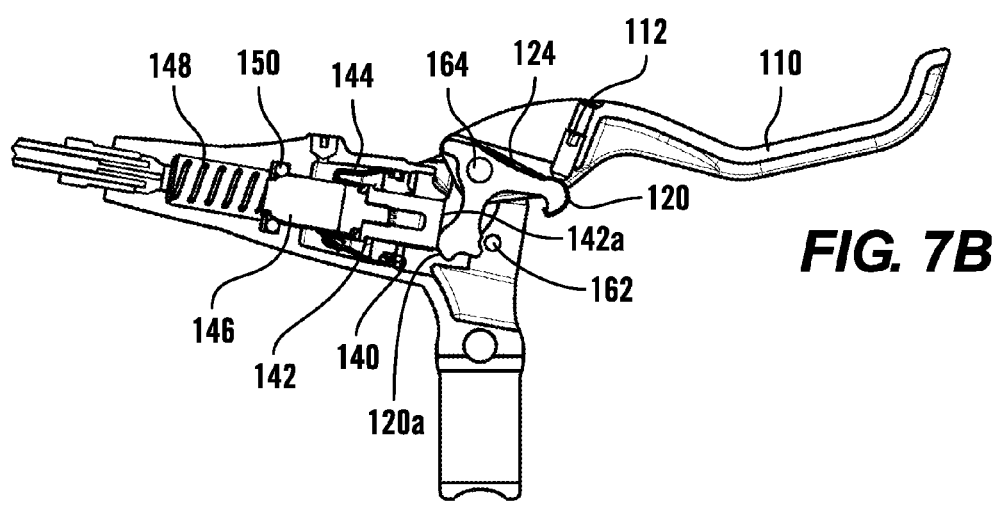
Figure 7C:
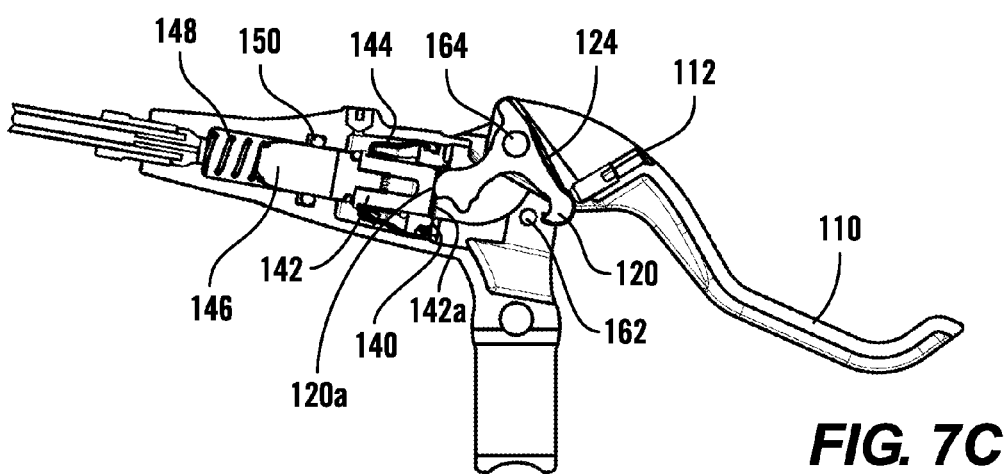

As shown in FIGS. 2B and 5A/B, pivot pin 164 has a knurled section 164a (providing an enlarged effective diameter) to secure pivot pin 164 within the end 110a of lever 110 (e.g. by interference fit); ends of pivot pin 164 facilitate pivoting of lever 110 in bushing 140c of retainer 140 inside mounting 130a of housing 130; and pivot passage 120a of cam 120 facilitates pivoting of the cam 120 on pivot pin 164. According to an exemplary embodiment, the assembly/mechanism 100 is of a type having a housing 130 and a lever 110 as an actuator. As indicated in FIG. 1, in the brake system for the bicycle the assembly/mechanism 100 at the handlebar is coupled to a brake or braking mechanism at the wheel. According to an exemplary embodiment shown in the FIGURES, the assembly/mechanism is of a type using a hydraulic coupling to the brake; actuation of the lever 110 of the assembly/mechanism 100 regulates a flow or supply of hydraulic fluid under pressure to the brake at a corresponding wheel to effect or release braking action at a brake mechanism (e.g. disc brake or other type of brake).

As indicated in FIGS. 2A, 2B and 2C, lever 110 extends from housing 130 and can be manipulated (e.g. actuated/pulled) by the rider to effect braking action for the bicycle. Lever 110 pivots on a pivot pin 164 installed within the housing 130 to urge cam surface 120a of cam 120 to assert a force on a piston cap 142 which in turn asserts a force to drive a piston 146 in an axial path of travel defined within a bore in the housing 130. The piston 146 is installed in the housing 130 to establish a reservoir 198 and a pressure chamber 194 for hydraulic fluid and sealed by a primary seal 150 in the bore of the housing 130. According to an exemplary embodiment as indicated in FIGS. 2B-2C, 6A-6B, 7A-7B and 8A-8B, the primary seal 150 (e.g. an O-ring seal or the like) for piston 146 is installed within the bore at the pressure chamber 194 within housing 130 (in distinction to alternative embodiments in which the seal may be installed on the body of the piston). As indicated in FIG. 2C, according to a preferred embodiment, one end of a flexible bladder 144 is sealed to piston 146 by piston cap 142; the other end of the flexible bladder 144 is sealed to housing 130 by retainer 140.

Manipulation of the lever 110 by cam action on the piston cap 142 allows movement of the piston 146 in a path of travel along the bore against a return spring 148 installed within pressure chamber 194 within the housing 130. The reservoir 198 and the pressure chamber 194 within the housing 130 may be separated or brought into fluid communication by movement of the piston 146 within a path of travel in the bore. When the lever 110 is actuated, piston 146 contacts primary seal 150 and pressure is exerted by the piston 146 (against the return spring 148 and the counter-pressure of hydraulic fluid transmitted through the pressure chamber 194) as the piston 146 moves along the bore; the action of piston 146 urges hydraulic fluid to flow from the pressure chamber 194 through brake hose/tube 200 to the effect braking action at the corresponding brake mechanism (see FIGS. 1 and 8C). Release of the lever 110 allows the return spring 148 to drive piston 146 along the bore and relieves pressure on the hydraulic fluid at the pressure chamber 194 and reduces or removes braking action at the corresponding brake mechanism (see FIGS. 1 and 8A-8B).

Figure 8A:
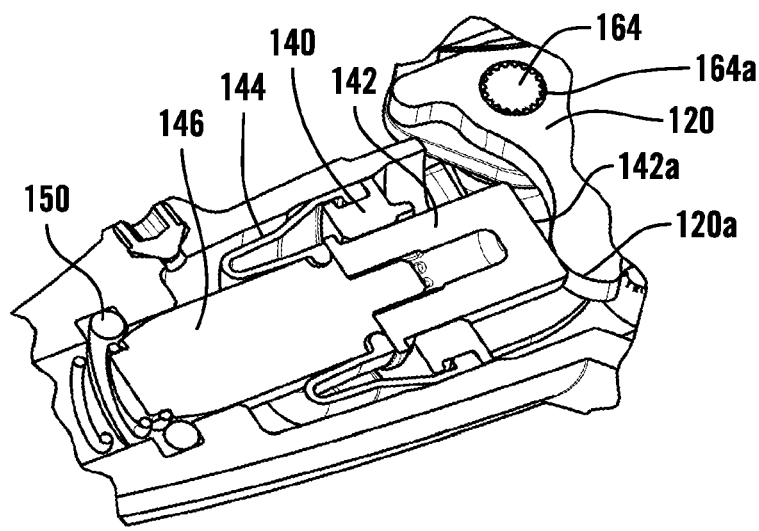
FIGS. 8A to 8C are schematic cut-away perspective views of the piston assembly of the master cylinder assembly of the brake system in operation according to an exemplary embodiment.

According to an exemplary embodiment, as shown in FIGS. 2B-2C, 6A-6B 7A-7B, 8A-8B and 10A-10B, the assembly/mechanism comprises a retainer 140. According to a preferred embodiment, as indicated in FIGS. 8A and 10B, the retainer is configured to perform a combination of features.

The retainer 140 may provide an internal bore indicated as the piston guide bushing surface 140b for axial movement of the piston cap 142 coupled to the piston 146 (see FIGS. 2B-2C and 10A).

The retainer may provide a set of circular apertures indicated as pivot bushing surface 140c for the pivot pin 164 on which the lever 110 is mounted and which serves as the axis for the rotary actuation of the lever 110 (see FIGS. 10A-10B).

Figure 8B:
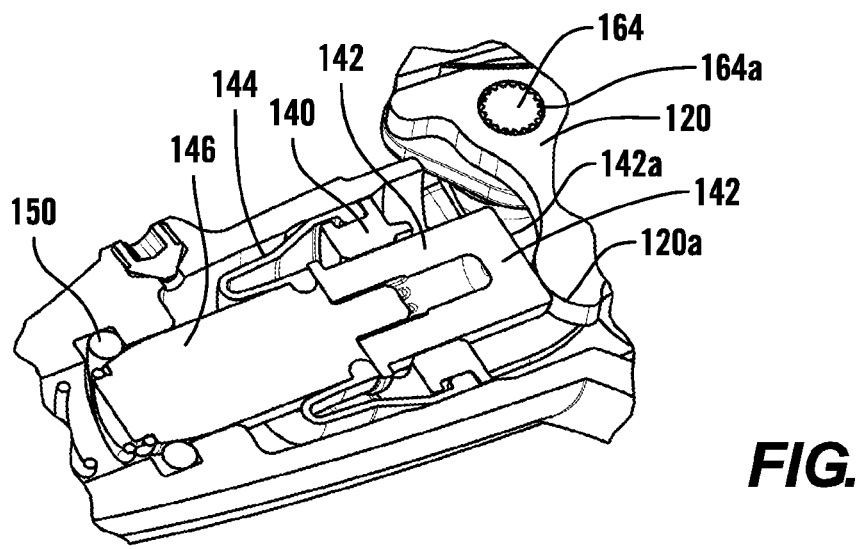
Figure 8C:
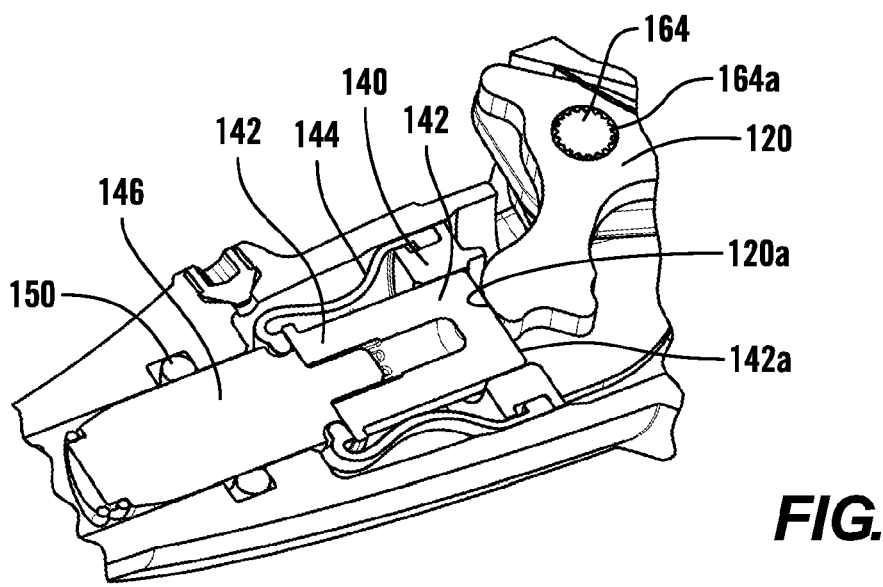

The retainer may provide a seal indicated as bladder sealing surface 140d as the interface on which one end of the bladder 144 is installed (see FIGS. 9 and 10A). The other end of the bladder 144 is sealed to the piston 146 to form a chamber for air contained inside of the bladder 144; on the outside of the bladder 144 is hydraulic fluid which will occupy the reservoir 198 formed inside the housing 130 between the outside of the bladder 144 and the exterior of the piston 146. See FIGS. 8A-8C. As the piston 146 travels within its bore, the he bladder 144 may be retracted (i.e. rolled up) as shown in FIG. 8A or may be in transition (i.e. extending/retracting) as shown in FIG. 8B or may be extended as shown in FIG. 8C.

The retainer may provide a feature indicated as lip 140a (e.g. curve projection or flange) that engages the cam surface 120a of the cam 120 driven by the lever 110 to serve as a stop (i.e. mechanical stop upon contact) for the cam 120 and for the lever 110 (see FIGS. 2C and 10B).

Operation of Assembly/Mechanism

As indicated schematically in the FIGURES, according to any exemplary embodiment, the brake system generally comprises a mechanism/assembly of a type actuated by a lever and configured to use a fluid providing a body or housing defining a pressure chamber, a piston assembly with a piston moveable along a stroke when advanced/retracted by operation of the lever, a bladder, a retainer and a primary seal. The bladder is fixed at a first end to the piston and fixed at a second end to the retainer. The primary seal is retained in the body or housing. A reservoir for the fluid is defined by the piston, the body, and the bladder. In basic operation, advancement of the piston causes the piston to seal against the primary seal and separate the reservoir from the pressure chamber. The bladder rolls out as the piston advances and rolls up as the piston retracts. The retainer serves to seal the bladder to the body, act as a piston guide bushing, act as a pivot bushing, and act as a stroke limiter. Upon advancement the piston will contact the primary seal and separate the reservoir from the pressure chamber thus pressurizing the fluid. The stroke of the piston is limited by a feature on the retainer which contacts the cam surface of the cam on the lever to prevent further rotation/movement. When the lever is released the piston will return/retract under the pressure of the fluid and aided by the return spring; a stop pin contacts the cam to prevent further return travel of the piston.

As shown according to the exemplary embodiment shown in FIGS. 1, 2A-2C and 6A-6B, 7A-7B and 8A-8B, the master cylinder assembly/actuation mechanism comprises (among other components and assemblies) a body or housing 130, piston 146, bladder 144, retainer 140 and primary seal 150. The bladder 144 is fixed at a first end to the piston 146 and fixed at a second end to the retainer 140. See FIG. 2C. The primary seal 150 is retained in the body or housing 130. See FIGS. 8A-8C. A reservoir 198 is defined by the exterior surfaces of the housing 130, the piston 146 and the bladder 144. See FIGS. 2C and 8A-8C. A pressure chamber 194 is defined within the interior form of the housing 130. See FIG. 2C.

According to an exemplary embodiment as indicated in FIGS. 6A-6B, 7A-7B and 8A-8B, advancement of the piston 146 causes the piston 146 to seal against the primary seal 150 and separate the reservoir 198 from the pressure chamber 194. A retainer 140 serves to seal the bladder 144 to the body or housing 130; the retainer 140 also acts as a piston guide bushing, act as a pivot bushing, and act as a stroke limiter for the cam 120/lever 110. See FIGS. 2C, 8C and 10A-10B.

Pulling the lever 110 pushes the threaded adjuster to screw against the leaf spring which is in contact with the cam 120 causing the cam 120 to rotate with the lever 110. The cam surface 120a of the cam 120 contacts surface 142a of the piston cap 142 which is press-fit to the piston 146. The piston cap 142 and the piston 146 move along the body bore guided by piston guide bushing surface 140b of the retainer 140. The flexible bladder 144 connected at one end to the retainer 140 and the other end to the piston 146 rolls out as the piston 146 advances within the bore. Upon advancement the piston 146 will contact the primary seal 150 and separate the reservoir 198 from the pressure chamber 194 thus pressurizing the hydraulic fluid in the pressure chamber 194. (According to an alternative embodiment, the piston cap and piston can be an integral form rather than separate components.)

The stroke of the lever 110 is limited by a feature show as lip 140a on the retainer 140 which contacts the cam surface 120a of the cam 120 preventing it from further rotation beyond the point of engagement/contact. See FIGS. 8C and 10B.

When the lever 110 is released the piston 146 will return under the pressure of the hydraulic fluid and aided by the return spring 148. See FIGS. 6B, 7B and 8B. The cam 120 will contact the stop pin 162 which prevents further return travel of the piston 146.

As indicated, various multiple adjustments may be made to the assemblies and mechanisms to adjust performance and operation of the system/assembly.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the system and method of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A brake system of a type with a master cylinder using a fluid comprising:
    (a) a body;
    (b) a piston;
    (c) a bladder connected to the piston to define a reservoir having a volume to contain fluid;
    (d) a lever to actuate the piston;
    wherein the body comprises a pressure chamber having a volume so that (a) advancement of the piston reduces the volume of the pressure chamber and (b) retraction of the piston expands the volume of the pressure chamber;
    wherein the body comprises a seal for the piston and the pressure chamber;
    wherein the lever is configured so that during operation of the lever a cam surface operated by the lever will engage a flat cam surface to actuate the piston.

2. The system of claim 1 further comprising a retainer within the body.

3. The system of claim 2 wherein the bladder is retained at the retainer.

4. The system of claim 3 wherein the bladder is retained at a first end of the piston.

5. The system of claim 1 wherein during advancement of the piston in the body the piston is engaged with the seal.

6. The system of claim 5 wherein a piston cap is mounted on the piston.

7. The system of claim 6 further comprising the flat cam surface on the piston cap.

8. The system of claim 1 further comprising a lever assembly comprising the lever and a cam; wherein the cam provides the cam surface; and wherein the lever pivots on a pin and the pin provides a knurled surface for connection to the lever by an interference fit.

9. A brake system of a type using fluid comprising:
    (a) a body defining a chamber having a volume;
    (b) a piston movable within the chamber of the body;
    (c) a bladder connected to the piston to define a reservoir having a volume to contain fluid;

(d) a lever to actuate the piston;
(e) a retainer for the bladder;
wherein the bladder is retained by the retainer at a first end and retained by the piston at a second end;
wherein actuation of the lever advances the piston into the chamber and reduces the volume of fluid in the chamber;
wherein the retainer is configured to limit advancement of the piston.

10. The system of claim 9 wherein the lever is pivoted on a pin; and wherein the pin provides a knurled surface for connection to the lever by an interference fit.

11. The system of claim 9 wherein the lever operates by cam action on the piston.

12. The system of claim 11 further comprising a piston cap on the piston to provide a cam surface for engaging a cam surface on an end of the lever.

13. The system of claim 9 wherein the bladder is retained by the retainer at a first end and retained by the piston at a second end; wherein the retainer seals the bladder to the body.

14. The system of claim 9 wherein the retainer comprises a guide for the piston.

15. A brake system comprising:
(a) a body defining a chamber;
(b) a piston movable within the body;
(c) a lever to actuate the piston;
(d) a pin for the lever to secure the lever in the body and facilitate rotation of the lever when actuated to advance the piston into the chamber;
(e) a bladder connected to the piston to define a reservoir having a volume to contain fluid;
wherein the pin comprises at least one end section and a generally intermediate section to secure to the lever;
wherein the intermediate section of the pin has a larger effective diameter than each end section.

16. The system of claim 15 wherein the intermediate section of the pin is connected to the lever by interference fit.

17. The system of claim 16 further comprising a cam actuated by the lever.

18. The system of claim 17 wherein the cam rotates about the intermediate section of the pin.

19. The system of claim 18 wherein the pin is coupled to the body on a mounting.

20. The system of claim 18 wherein the mounting comprises a clevis.

21. The system of claim 18 further comprising a piston cap on the piston to provide a cam surface for engaging a cam surface on an end of the lever.

22. The system of claim 15 wherein the bladder is retained by a retainer at one end and by the piston at another end.

23. The system of claim 22 wherein actuation of the lever advances the piston into the chamber and reduces the volume of fluid in the chamber.

24. The system of claim 15 wherein the intermediate section of the pin is knurled.

* * * * *